United States Patent [19]  [11] 4,133,658
Callewyn  [45] Jan. 9, 1979

[54] INDUSTRIAL DUST COLLECTION SYSTEM AND APPARATUS

[76] Inventor: Leo R. Callewyn, 7132 Marshall, Arvada, Colo. 80003

[21] Appl. No.: 844,376

[22] Filed: Oct. 21, 1977

[51] Int. Cl.² .............................................. B01D 50/00
[52] U.S. Cl. ........................................ 55/315; 55/328; 55/337; 55/357; 55/358; 55/429; 55/459 C; 55/DIG. 3; 15/327 C; 15/349; 15/353
[58] Field of Search ................. 55/315, 328, 334, 337, 55/356, 358, 357, 418, 422, 429, 459 C, DIG. 3, 459 R, 204; 15/327 C, 347, 349, 352, 353

[56] References Cited

U.S. PATENT DOCUMENTS

| 927,712 | 7/1909 | Christoph | 55/459 R |
|---|---|---|---|
| 2,171,248 | 8/1939 | Van Berkel | 55/429 |
| 2,703,733 | 3/1955 | Stueven | 55/356 |
| 3,048,875 | 8/1962 | Bottinelli et al. | 15/353 |
| 3,120,432 | 2/1964 | Aldrich | 55/315 |
| 3,308,609 | 3/1967 | McCulloch et al. | 55/337 |
| 3,727,377 | 4/1973 | Chapman | 55/459 R |
| 3,820,310 | 6/1974 | Davis et al. | 55/459 C |

FOREIGN PATENT DOCUMENTS 45614  5/1932 Denmark .................................. 55/315

Primary Examiner—Frank W. Lutter
Assistant Examiner—David L. Lacey
Attorney, Agent, or Firm—Bruce G. Klaas

[57] ABSTRACT

An industrial dust collection system for collecting dust created by operation of a machine comprising dust collecting and storage means remote from the machine; a cyclone chamber means associated with the dust collecting and storage means for receiving dust laden air from the machine; forced air blower fan means associated with the cyclone chamber means for establishing a continuous induced flow of dust laden air from the machine to the fan means and for establishing a flow of dust laden air from the fan means to the cyclone chamber means; flow direction control means in the chamber means for establishing a circular and axially downward flow of dust laden air within the cyclone chamber means; vortex chamber means within the cyclone chamber means for establishing an upward flow of air in the center of said cyclone chamber means; and dust discharge passage means connecting said cyclone chamber means to said dust collecting means for transfer of dust from said cyclone chamber means to said dust collecting means prior to entry of air into said vortex chamber means.

15 Claims, 2 Drawing Figures

INDUSTRIAL DUST COLLECTION SYSTEM AND APPARATUS

BACKGROUND AND SUMMARY OF THE INVENTION

This invention generally relates to dust collection systems and apparatus, and, more particularly, to an industrial dust collection system and apparatus for collecting dust material, such as saw dust of wood products, from machines, such as wood working machines, including saws, joiners, planers, drills, sanders, grinders, routers, etc.

Many present day manufacturing factories and shops have a plurality of machines for performing various metal and plastic and wood cutting, shaping and finishing operations. Such machines commonly are provided with integrated receptacles or storage chambers for collecting material chips and dust particles generated during the operation thereof. When these receptacles or storage chambers become filled with chips and dust particles, they are commonly emptied at the machine. Even before these machine receptacles become filled there are often problems with dust accumulation about the machine parts and in the air adjacent the machine.

It is a primary objective of the present invention to provide a system and apparatus, which may be separate from the machine, to continuously remove and store dust particles during operation of the machine.

Another object of the invention is to provide a system and apparatus separate from the machine which may be used in connection with a plurality of machines.

Another objective is to provide a system and apparatus which is portable and which has separable portable dust collecting means.

Another object is to provide a system and apparatus which is readily usable with existing machines as located and arranged in existing facilities without any substantial modification thereof.

Another object is to provide a complete system and apparatus which is of relatively low cost and which may be installed and used with existing machines without substantial modification of such machines.

Another object is to provide a system and apparatus which greatly reduces dust accumulation in and around machines while also operating very efficiently and quietly at relatively low cost, and being capable of moving high volumes of air at relatively low horsepower.

In general, the foregoing objectives, as well as other objectives and advantages, have been obtained by a system and apparatus comprising a dust collecting and storing means, in the form of a conventional 55 gallon metallic drum mounted on caster means, having an upper dust receiving inlet opening for collecting and storing dust transferred thereto from machines remotely located relative thereto; cyclone chamber means, associated with and mounted on top of the dust collecting and storage means and having an annular cyclone chamber therewithin and an upper dust laden air receiving inlet opening thereto and a lower dust discharge outlet opening therefrom connected to the upper dust receiving inlet opening of the dust collection means, for receiving dust laden air from the machine through the dust laden air receiving inlet opening and transferring dust to the dust collection means through the lower dust discharge outlet opening to the dust collection means through the upper dust receiving inlet opening thereof; forced air blower-type fan means, associated with the cyclone chamber means and having a dust laden air receiving inlet opening connected to the machine dust collection chamber and a dust laden air discharge opening connected to the annular cyclone chamber of the cyclone housing means through the upper dust laden air receiving inlet opening thereof, for establishing a continuous induced flow of air and dust from the machine dust collection chamber to the forced air fan means through the dust laden air receiving inlet opening thereof and a continuous forced flow of dust laden air to the cyclone chamber through the upper dust laden air inlet opening of the cyclone chamber means; first dust laden air flow conduit means connecting the dust laden air inlet opening of the forced air fan means to the machine dust collection chamber for establishing a flow of dust laden air from the machine dust collection chamber to the forced air fan means; second dust laden air flow conduit means connecting the dust laden air outlet opening of the forced air fan means to the annular cyclone chamber through the upper dust laden inlet opening of the cyclone chamber means for establishing a dust laden air flow from the forced air fan means to the annular cyclone chamber and for causing a unidirectional circumferential flow of dust laden air along the outer periphery of the annular cyclone chamber; third funnel shaped air flow conduit means mounted in the cyclone chamber means in coaxial relationship to the annular cyclone chamber and to the lower dust discharging outlet opening of the cyclone chamber means and having a vertically extending air passage with a lower air inlet opening axially upwardly spaced from the said lower dust discharging opening and an upper air discharge opening axially upwardly spaced from the cyclone chamber for providing an upwardly extending separate air flow path therewithin and for causing downward and radial inward flow of dust laden air toward the lower air inlet opening and for causing downward flow of dust through the dust discharge opening into the dust storage chamber through the upper dust inlet opening of the dust storage means and for causing upward flow of air through the lower air inlet opening into and upwardly through the vertical air passage to the upper air discharge opening.

BRIEF DESCRIPTION OF DRAWING

An illustrative and presently preferred embodiment of the invention is shown in the accompanying drawing in which.

DETAILED DESCRIPTION OF INVENTION

Figure 1:
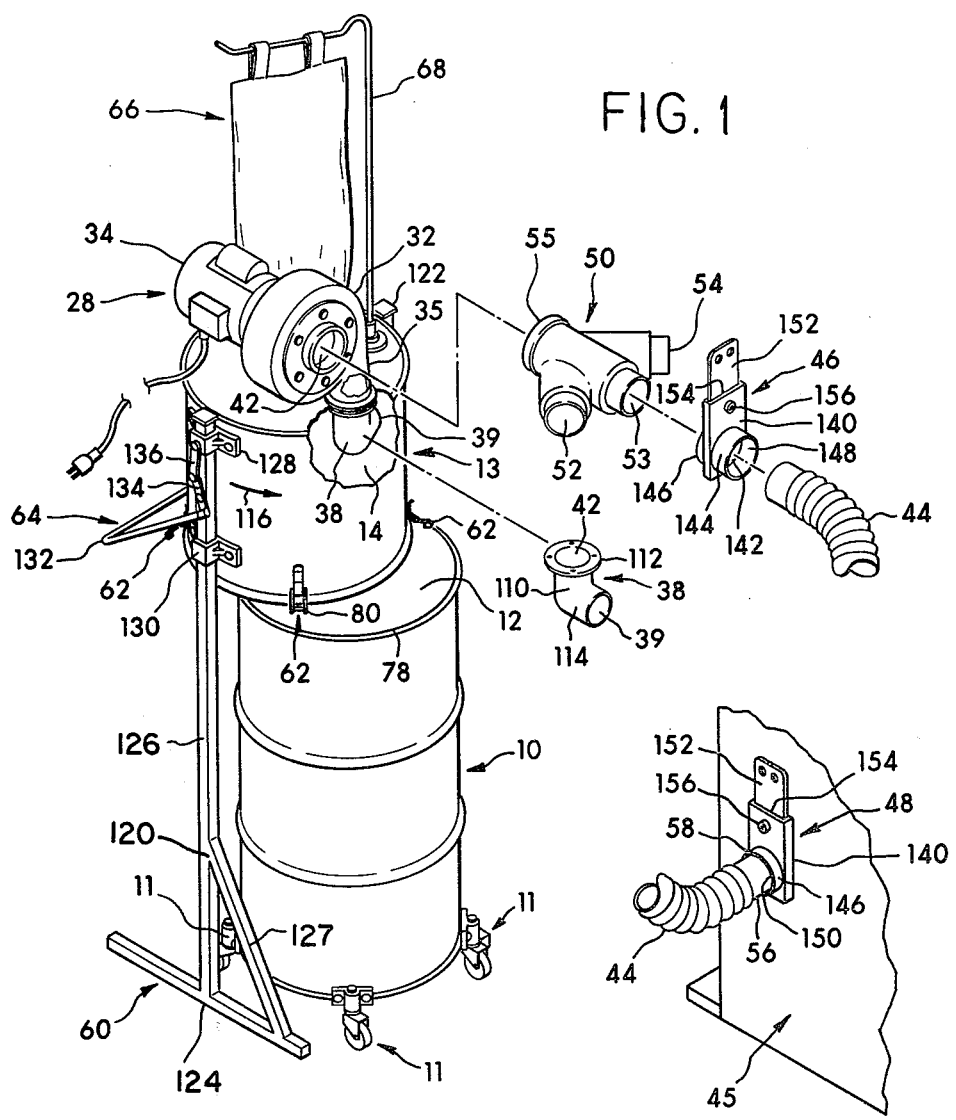
FIG. 1 is an exploded perspective view of the apparatus of the present invention with the dust collection chamber means disconnected from the cyclone chamber means.

In general, the apparatus comprises a relatively large volume dust collection container means 10, which may be in the form of a conventional 55 gallon metal drum member mounted on caster means 11 so as to be easily movable, for providing a relatively large volume dust collection chamber 12. A cyclone housing means 13 is removably mounted on and supported by the container means 10 for providing an annular cyclone chamber 14 connected to the container means 10 by dust discharge passage means in the form of a central lower opening 16, FIG. 2, of smaller diameter than the diameter of the container means collection chamber 12. A vortex chamber means 18 is centrally mounted in the cyclone housing means 12 through a central opening 19 and provides a funnel shape central air passage 20 extending from a lowermost air inlet opening 22, coaxial with the container opening 16 and of reduced diameter relative thereto and located in relatively closely axially upwardly spaced relationship thereto, to an uppermost air outlet opening 26 of larger diameter than the inlet opening 22 but of smaller diameter than the container opening 16.

An air blower means 28, in the form of a fan member 30 rotatably mounted in a blower housing member 32 and operable by an electric motor 34, is mounted on the top of the cyclone housing means 13 with a tangentially vertically downwardly extending outlet passage portion 35 connected to an air flow direction controlling means in the form of an elbow member 38, FIG. 1, mounted in the cyclone chamber 14 and providing an air outlet opening 39 facing the sidewall of the cyclone housing means 13 at an angle of inclination such as to establish a circumferential flow of air therealong. The member 38 is connected to passage 35 through an opening 40, FIG. 2, in the cyclone housing means 13. An axially extending blower inlet passage 42 in an end plate member 43 is connectable by suitable flexible hose means 44, FIG. 1, to work areas or work devices, such as the dust collection chambers of wood working machinery 45, to be cleaned. Air flow control means 46, 48 may be provided for partially or completely stopping air flow through the flexible hose means. Suitable multiple passage connector means 50 having multiple branch passages 52, 53, 54, connected by a common outlet passage 55 to the fan inlet passage 42, may be provided for connecting multiple machines or collection stations to the blower means by use of multiple flexible hose means. Air flow control means 46, 48 may be associated with each branch passage at the connector means 50 and/or at the work station 45 to close off the branch passage when the machinery at the work station is not in use. The flexible conduit means 44 may be of any desired length and connected to the machine collection chambers by any suitable connector means 56, 58 to establish a substantially closed, but preferably not airtight, air flow passage from the machine collection chamber to the fan means.

A support frame means 60 is provided for supporting the apparatus in a fixed stationary position on the floor in any selected position. Suitable latch means 62 releasably connect the cyclone housing means 13 to the container means 10. A lift lever and linkage means 64 is provided for causing vertical displacement of the cyclone housing means relative to the container means between a lowermost position of supportive engagement therebetween, FIG. 2, and an uppermost raised position of disengagement therebetween, FIG. 1, enabling lateral movement of the container means away from the frame means and the cyclone housing means for the purpose of, for example, emptying the container means.

A dust filter means, in the form of a cloth bag 66, supported in a vertical position by a support rod member 68 on the top of the cyclone housing means, may be connected to the outlet opening 26 of the vortex chamber means 18 to prevent escape of any dust carried in the discharged air and enable any dust collected therein to fall downwardly through vortex passage 20 and opening 16 into the dust collection chamber 12. The dust collection bag 66 is porous so as to provide no substantial restriction to discharge air flow while also retaining any small amounts of dust which may be carried in the air discharged from opening 26. The vertical position of the bag enables dumping of the dust collected in the bag, without removal of the bag, by free fall downwardly through vortex passage 20 and opening 16 into the dust collection chamber 12.

In operation, the electric motor 34 continuously operates the blower means 28 to cause a continuous steady flow of dust laden air from the machine collection chambers 45 through the open ones of any of the flexible conduits 44 to the fan inlet opening 42. The dust laden air is driven through the fan housing chamber and into the cyclone chamber 14 through passage 36, opening 40, elbow 38 and opening 39 in a direction generally tangential to the inner annular surface of the cyclone chamber 14. The dust laden air flows circumferentially and downwardly along the inner surface of the cyclone chamber and then radially inwardly toward the inlet opening 22 in the vortex chamber means 18 whereupon the dust falls into the dust collection chamber 13 through inlet opening 16 while limited low velocity and low pressure air flow continues upwardly through opening 22, funnel passage 20, and outlet opening 26 to the atmosphere.

When it is necessary or desireable to empty the collection chamber means 10, the latch means 62 are released and the lever handle member is pushed downwardly to actuate the linkage means and cause the cyclone chamber housing to be raised by vertical upward sliding movement relative to the frame posts. Then the collection chamber means 10 may be moved laterally on the caster means 11 to be emptied at any desired location. Another collection chamber means, or the same collection chambers after being emptied, may then be positioned beneath the cyclone housing means 13 and connected thereto by lowering the cyclone housing means by actuation of the lever-linkage means 64 and resetting of the latch means 62.

The arrangement is such that one dust collecting unit may be selectively used in association with only one machine at one work station by use of a single flexible conduit means 44 or multiple machines at multiple work stations by use of multiple flexible conduit means. In addition, when a machine at a particular work station is not in use, the dust collection means can be disconnected from that machine either at the fan inlet end or at the machine end by simply closing the air flow shut-off devices 46, 48 located adjacent thereto without continuously energizing and de-energizing the electric motor or continuously subjecting the system to unnecessary loads.

Figure 2:
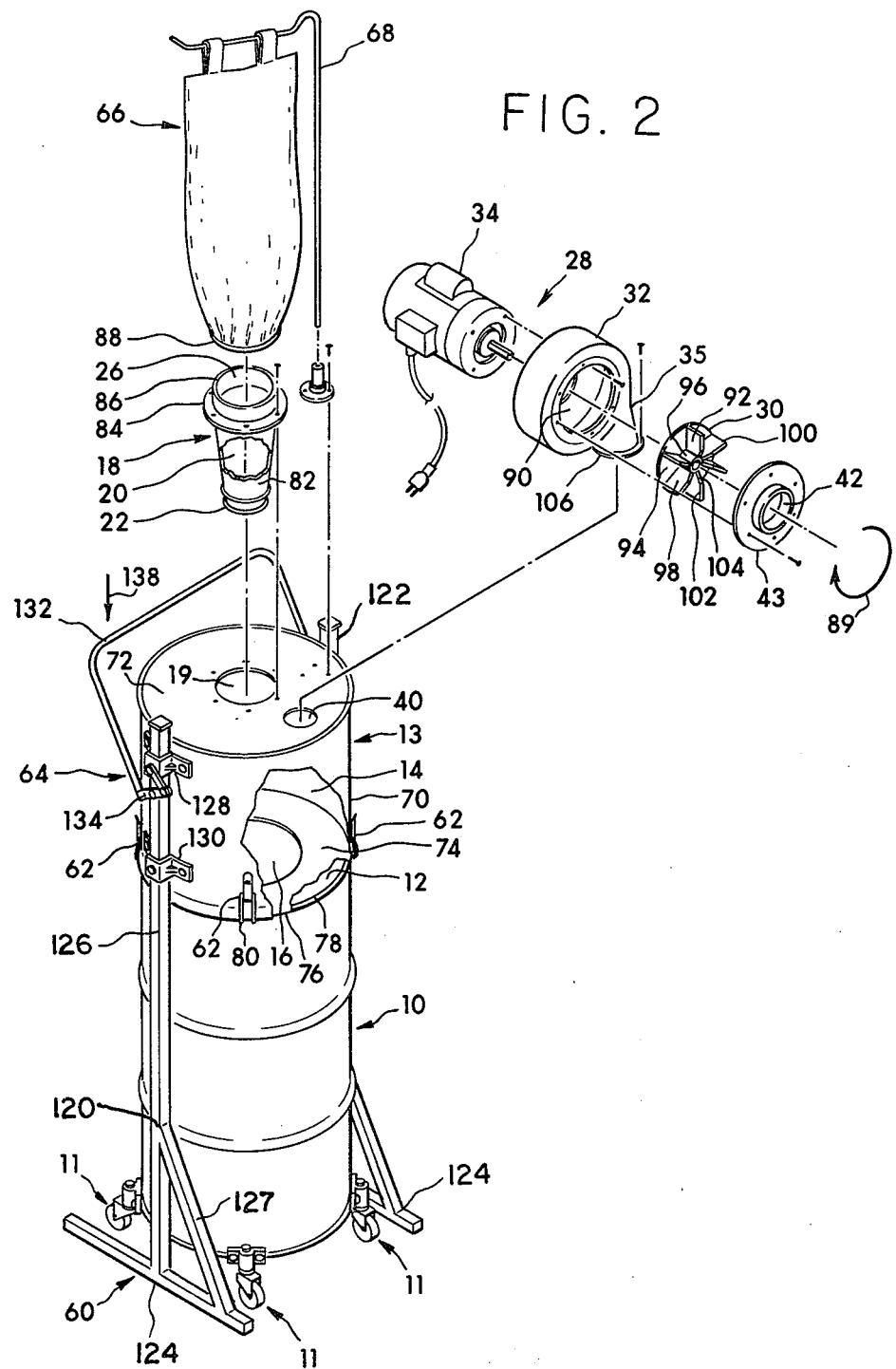
FIG. 2 is another exploded perspective view of the apparatus with the dust collection chamber means connected to the cyclone chamber means.

As shown in FIG. 2, the cyclone housing means 13 comprises a cylindrical sidewall portion 70, an upper end plate member 72 in which mounting openings 19, 40 are provided, and a lower end plate member 74 in which dust discharge opening 16 is provided. The periphery 76 of the lower end plate member may be downwardly curved to seat on and closely fit the upper peripheral bead 78 of the container means 10. The latch means 62 are of conventional spring and toggle type fixedly mounted on the housing means 13 with wire members 80 having curved end portions adapted to releasably grippingly engage the beaded rim portion 78 of the container means. An annular sealing member (not shown) made of neoprene or the like is preferably mounted between peripheral surface 76 and rim portion 78 to tightly seal the chamber 12.

The vortex chamber means 18 comprises an elongated conical body portion 82 having a mounting flange 84 and an annular connecting rim 86 at the upper end thereof. The inlet opening 88 of the dust bag is mountable on the rim 86 to confine flow of discharge air to the inside of the porous bag 66. The conical funnel shape of the passage 20 and the location of air inlet opening 22 relative to the dust discharge opening 16 is such as to establish a radially inward flow of air in the lower portion of the cyclone chamber from the sidewall portion 70 along the lower end plate member 74 toward and across the dust discharge opening 16 to the air inlet opening 22 whereat the air flows upwardly through inlet opening 22 into and upwardly through conical passage 20 to the air discharge opening 26. In this manner, changes in air velocity, air pressure differentials, and the effect of gravity on the heavier dust particles causes effective removal of the dust from the air over the dust discharge opening 16 with the dust particles moving downwardly through opening 16 into the dust collection chamber 12.

The air blower means 28 is continuously operable in one direction, as indicated by arrow 89, by an electric motor 34 to cause dust laden air to be forcibly driven into the cyclone housing means chamber 14 from air-dust fan housing inlet opening 42 through tangential air-dust discharge passage 35 to the air-dust discharge opening 39 in elbow 38. The electric motor is of relatively low (i.e., 1 or 2 hp) horsepower capable of moving relatively high volumes of air, e.g., 650 cfm to 5100 fpm with a 1hp 3450 rpm motor and a four inch diameter inlet opening 42. The fan member 30 is rotatably mounted in an annular chamber 90 and comprises a plurality of equally circumferentially spaced radially extending blade portions 92, mounted on an end plate 94 and a hub portion 96. In the presently preferred embodiment of FIG. 2, each blade portion 92 comprises radially extending side surfaces 98 of relatively large area; peripheral axially extending surfaces 100 located closely adjacent the peripheral surface of annular chamber 90 while extending axially across substantially the entire width of chamber 90, a radially extending radially outermost side surface 102, next adjacent the inlet opening 42, located in closely spaced relationship to the adjoining side surface of chamber 90; and an inclined radially innermost side surface 104 substantially radially aligned with inlet opening 42 so as to define a generally conical passage from the inlet opening 42 into the chamber 90. The outlet passage 35 extends vertically from an inlet opening (not shown) in the peripheral surface of annular chamber 90 and terminates in a mounting flange 106 for fixed attachment on the upper surface of upper end plate 72 of cyclone housing 13 circumjacent opening 40.

The elbow member 38 has a vertically extending inlet passage portion 110 terminating in a mounting flange 112 for attachment to the lower surface of upper end plate 72 circumjacent opening 40 and a generally horizontally extending outlet passage portion 114. The control means 38 is mounted so that the central axis of the outlet passage portion 114 intersects the side wall portion 70 of the cyclone housing 13 at an acute angle, with the outlet opening 39 facing and relatively closely spaced from the sidewall portion 70, whereby the dust laden air discharged through outlet opening 39 is directed onto the inner annular surface of sidewall portion 70 at a corresponding angle to cause a circumferential flow of dust laden air along the inner surface in the direction of arrow 116. The construction and arrangement is such that the dust laden air flows circumferentially along the inner peripheral surface sidewall portion 70 and axially downwardly therealong to the effective zone in the lower end portion thereof where the radial inward flow toward the inlet opening 22 of the vortex chamber means 18 is established.

The support frame means 60 comprises a pair of frame members 120, 122 each having a flat horizontal base portion 124 adapted to be supported on the floor of a shop area, a vertically extending post portion 126 of square crosssectional configuration, and a brace portion 127. The cyclone housing means 13 is vertically movably mounted on the post portions 126 by bracket means 128, 130 fixedly attached to the cyclone housing sidewall portion 70 and slidably receiving the post portions 126. The lift lever and linkage means 64 comprises a U-shaped handle member 132 connected at opposite ends to one end of a first link member 134 centrally pivotally connected to the adjoining post member 124 with the other end portion pivotally connected to one end of a second link member 136 having the other end pivotally connected to the upper slide bracket 128. The construction and arrangement is such that, when the latch means 62 are released and a vertically downward force is applied to the handle member 132 in the direction of the arrow 138, FIG. 2, the handle member 132 pivots downwardly to cause the link members 134 to pivot upwardly relative to the post members 124 to cause the link members 136 to pivot downwardly resulting in vertical upward movement of slide brackets 128 and cyclone housing means 13 relative to posts 124. In this manner, the cyclone housing means 13 may be moved between a lower engaged operational position, whereat it is clamped to and supported on the collection container means 10, and an upper disengaged position whereat it is completely released from and unsupported by the collection container means to enable the container means to be removed and/or replaced for emptying when full of dust. When the latch means 62 are not released and the cyclone housing means 13 is supported on the container means 10, the support frame members 120, 122 may be lifted vertically relative to the collection container means 10 and the cyclone housing means 13 whereby the weight of the apparatus is supported solely by the caster members 11 to enable movement as necessary or advisable.

While the apparatus may be used with only one machine 45 connected by only one flexible hose means 44, the apparatus is sufficiently effective in operation to enable simultaneous multiple usage with multiple machines connected to the apparatus by separate multiple hose means through a multiple passage connector means 50. When multiple hose means are utilized, it is desirable and advantageous to employ air flow shut off means 46 and/or 48 with each hose means so as to be able to disconnect the apparatus from machines which are not in use at any particular time while enabling continued connection of the apparatus to machines which may be in use at any particular time. The air flow shut off means 46, 48 comprise a flat elongated generally rectangular housing portion 140 having an annular passage 142 extending through one end thereof and including annular hose mounting members 144, 146 provided an inlet opening 148 and an outlet opening 150. An elongated generally rectangular slide valve member 152 is slidably movably mounted in a close fitting generally rectangular slot 154 in the housing portion 140 which transversely intersects and extends across passage 142. The valve member 152 is slidably movable in slot 154 between a closed position, a half open position and a full open position relative to the passage 142. Ball-spring detent means 156 may be provided to releasably hold the valve member 152 in the half open and full open positions.

While the aforedescribed illustrative and presently preferred embodiment of the invention provides particularly good results, it is contemplated that the inventive concepts may be variously otherwise embodied and it is intended that the appended claims be constructed to include alternative embodiments except insofar as limited by the prior art.

What is claimed is:

1. An industrial dust collection system for collecting dust created by operation of a machine comprising:
   dust collecting and storage means having a cylindrical side wall portion mounted in a vertical position for collecting and storing dust generated by a machine;
   cyclone chamber means mounted on the upper end of the dust collecting and storage means in a vertical position and having a cylindrical side wall portion and an annular upper end wall portion and an annular lower end wall portion and a dust inlet opening at the upper end thereof, for receiving dust laden air from the machine;
   forced air fan means connected to the cyclone chamber means for establishing a continuous induced flow of dust laden air from the machine to the fan means and for establishing a flow of dust laden air from the fan means to the cyclone chamber means;
   flow direction control means connected to said forced air fan means and being mounted in the chamber means for establishing a circular and axially downward flow of dust laden air within the cyclone chamber means;
   vortex chamber means mounted within the cyclone chamber means and having a vertically extending funnel shape passage located centrally and coaxially relative to said cylindrical side wall portion and an annular inlet opening of minimum diameter at the lower end of said cyclone chamber means and an annular outlet opening of maximum diameter at the upper end of said cyclone chamber means for establishing an upward flow of air therethrough in said cyclone chamber means; and
   said annular lower end wall portion defining dust discharge passage means in having an annular opening of a diameter greater than the diameter of said annular inlet opening of said vortex chamber means and being axially spaced therebelow for connecting said cyclone chamber means to said dust collecting and storage means for transfer of dust from said cyclone chamber means to said dust collecting and storage means prior to entry of air into said vortex chamber means.

2. The industrial dust collection system as defined in claim 1 and wherein said forced air fan means being mounted on said cyclone chamber means.

3. The industrial dust collection system as defined in Claim 2 and further comprising:
   conduit means for connecting said fan means to the machine.

4. The industrial dust collection system as defined in Claim 3 and wherein said fan means further comprising:
   a horizontally axially extending inlet opening connected to said conduit means; and
   a vertically extending outlet passage connected to said flow direction control means in said cyclone chamber means.

5. The industrial dust collection system as defined in claim 1 and further comprising:
   support frame means positioned and arranged with respect to said dust collection and storage means and with said cyclone chamber means for nonmovable support thereof during operation and for relative movable support thereof to enable said cyclone chamber means to be moved vertically relative to said dust collection and storage means between a lower position in operable association therewith and an upwardly raised position in disassociated relationship thereto.

6. The industrial dust collection system as defined in Claim 5 and said support frame means further comprising:
   lift lever and linkage means operably connected to said cyclone housing means for lifting and lowering said cyclone housing means relative to said dust collection and storage means.

7. The industrial dust collection system as defined in Claim 6 and further comprising:
   releaseable latch means positioned and arranged with respect to said dust collection and storage means and said cyclone housing means and being operable between a latched position for fixedly connecting one to the other and an unlatched position for enabling relative movement therebetween.

8. The industrial dust collection system as defined in Claim 7 and further comprising:
   caster means on the lower end of said dust collection and storage means for enabling lateral movement thereof relative to said support frame means and said cyclone chamber means in the disassociated position.

9. The industrial dust collection system as defined in claim 8 and wherein said lift lever and linkage means being constructed and arranged for enabling vertical upward movement of said support frame means relative to said dust collection and storage means and relative to said cyclone chamber means in said latched position whereby the caster means further enabling unitary lateral movement of the support frame means, and the dust collection and storage means and the cyclone chamber means.

10. The industrial dust collection system as defined in claim 1 and further comprising:
    multiple passage connector means positioned and arranged with respect to said conduit means for connecting a plurality of conduit means to said fan means.

11. The industrial dust collection system as defined in claim 10 and further comprising:
    flow control means positioned and arranged with respect to said conduit means for enabling and disabling flow of air therethrough.

12. The industrial dust collection system as defined in claim 1 and further comprising:
    filter bag means mounted on said cyclone housing means and being connected to said upper outlet opening of said vortex housing means for preventing escape of dust in the discharge air flow.

13. The industrial dust collection system as defined in claim 12 and wherein said filter bag means being mounted in vertical alignment with said vortex housing means and said dust discharge passage means for enabling vertical free fall of dust from said bag means to said dust collection and storage means.

14. The industrial dust collection system as defined in claim 1 and wherein said flow direction control means comprising:

an elbow member having a vertically upwardly facing inlet opening connected to said vertically extending outlet passage of said fan means and a laterally facing outlet opening facing the sidewall portion of said cyclone housing means.

15. The industrial dust collection system as defined in claim 14 and wherein said elbow member further comprising:

a generally vertically extending inlet passage connected to said inlet opening; and a generally horizontally extending outlet passage connected to said inlet passage and said outlet opening and having a central axis extending at an acute angle relative to the sidewall portion of said cyclone housing means.

* * * * *